United States Patent

Miyano

Patent Number: 5,518,545
Date of Patent: May 21, 1996

[54] APPARATUS FOR CONVEYING DISCRETE PARTS

[76] Inventor: Toshiharu T. Miyano, 50 Dundee La., Barrington Hills, Ill. 60010

[21] Appl. No.: 246,942

[22] Filed: May 19, 1994

[51] Int. Cl.⁶ .................................................. B05C 13/00
[52] U.S. Cl. ........................... 118/500; 118/300; 118/305; 118/320; 118/501; 406/111; 406/113; 406/177; 406/186
[58] Field of Search ................................. 104/138.2, 138.1; 105/241.2, 241.1, 244; 406/109, 110, 111, 112, 113, 83, 84, 176, 180, 177, 154, 186, 194, 191–198, 197, 167, 164; 414/217, 220, 222, 359, 357, 581; 118/300, 500, 319, 501, 320, 66, 322, 305, 314; 269/13, 14, 309, 304, 289 MR

[56] References Cited

U.S. PATENT DOCUMENTS

| | | | |
|---|---|---|---|
| 2,393,932 | 1/1946 | Petroe | 406/122 |
| 3,189,297 | 6/1962 | Ellithorpe | 406/111 |
| 3,527,428 | 10/1968 | Skibicki | 406/111 |
| 4,051,960 | 10/1977 | Raksanyi | 214/63 |
| 4,170,944 | 10/1979 | Zhukov et al. | 104/138.1 |
| 4,583,884 | 4/1986 | Taneda et al. | 406/73 |
| 5,382,126 | 1/1995 | Hartig et al. | 414/217 |

FOREIGN PATENT DOCUMENTS

| | | | |
|---|---|---|---|
| 1103852 | 5/1958 | Germany | 406/186 |
| 56-70222 | 6/1981 | Japan | 406/113 |
| 1110425 | 4/1989 | Japan | 406/110 |
| 0559529 | 2/1978 | U.S.S.R. | 406/176 |
| 1162654 | 6/1985 | U.S.S.R. | |
| 1323530 | 7/1973 | United Kingdom | 405/176 |

*Primary Examiner*—Laura Collins
*Attorney, Agent, or Firm*—Wood, Phillips, VanSanten, Clark & Mortimer

[57] ABSTRACT

An apparatus for conveying discrete parts between first and second locations. The conveying apparatus has a receptacle for at least one part. Structure is provided for guiding movement of the part receptacle between the first and second locations. Structure is also provided for conveying the part receptacle a) from the first location to the second location and b) from the second location to the first location.

22 Claims, 6 Drawing Sheets

APPARATUS FOR CONVEYING DISCRETE PARTS

BACKGROUND OF THE INVENTION

1. Field of the Invention

This invention relates to an apparatus for moving a part receptacle back and forth between first and second locations wherein parts can be placed in the part receptacle at the first location and removed from the part receptacle at the second location.

2. Background Art

It is known to use automated conveyors to transfer discrete parts between two different locations. In one exemplary system, a part that has been operated upon by a machine tool is conveyed away from the machining location to another machining location, a storage bin, or other appropriate location.

One known conveyor construction employs an endless belt trained around a plurality of rollers. With the belt driven in use, parts can be supported on, and conveyed by, the upwardly facing surface of the conveyor belt.

This conventional conveyor system has a number of drawbacks. First of all, the conveyed parts are fully exposed during conveyance. There is no practical way in these systems to shield the parts as they are conveyed.

Secondly, the parts are normally held on the conveyor belt by friction forces between the parts and upper belt surface. At steep angles, the parts are prone to slipping. This may altogether prevent conveyance or may cause an irregular spacing to develop between successive parts on the upper surface of the conveyor belt.

Specialty conveyors may utilize vacuum, magnets, or the like to cause the parts to adhere to the conveyor belt. However, these systems may become complicated and expensive.

A further problem with conventional conveyors of the type described above is that they are generally one-dimensional. That is, they perform a conveying function but do not lend themselves to facilitating the performance of other steps on the conveyed parts. For example, if the parts are to be washed or otherwise treated with a fluid, these operations must normally be carried out at a location away from the conveyor. Otherwise, the treating fluid adheres to the conveyor belt surface and/or the belt operating structure in such a fashion that the conveyor function may be impaired. The treating material may also spread undesirably to the surrounding work area.

The performance of an operation on the conveying parts is difficult in the case of frictionally held parts. The parts tend to orient randomly on the conveying surface and may not be accurately spaced and oriented to allow automated performance of desired steps on the conveying parts.

SUMMARY OF THE INVENTION

The present invention is specifically directed to overcoming the above enumerated problems in a novel and simple manner.

In one form of the invention, an apparatus is provided for conveying discrete parts between first and second locations. The conveying apparatus has a receptacle for at least one part. Structure is provided for guiding movement of the part receptacle between the first and second locations. Structure is also provided for conveying the part receptacle a) from the first location to the second location and b) from the second location to the first location.

The part receptacle has structure for releasably accepting a discrete part whereby the part can be placed into the part receptacle at the first location and removed from the part receptacle at the second location.

In one form, the guiding structure is defined by an elongate conduit having an internal space within which the part receptacle is guided between the first and second locations. The elongate conduit has first and second ends with there being structure for selectively closing and opening the first and second ends of the elongate conduit. The structure for conveying the part receptacle may be a pneumatic structure for conveying the part receptacle in the internal space a) from the first location to the second location with the first closing structure closing the first end of the elongate conduit and the second end of the elongate conduit open and b) from the second location to the first location with the second closing structure closing the second end of the elongate conduit and the first end of the elongate conduit open.

In one form, there is a first cap for selectively closing the first end of the elongate conduit and a second cap for closing the second end of the elongate conduit. There is structure cooperating between the guiding structure and the first and second end caps to guide relative movement between a) a first position wherein the first end cap closes the first end of the elongate conduit and the second end of the elongate conduit is open and b) a second position wherein the second end cap closes the second end of the elongate conduit and the first end of the elongate conduit is open.

In one form, the structure cooperating between the guiding structure and the first and second end caps includes at least one elongate rail and structure cooperating between the elongate rail and at least one of the guiding structure and the first and second end caps for guiding relative movement between the elongate rail and the at least one of the guiding structure and the first and second end caps as the guiding structure and first and second end caps are relatively moved between the first and second positions.

The part receptacle has a storage space and an entry opening communicating with the storage space. In one form, the guiding structure guides movement of the parts receptacle between a loading position and an unloading position and includes structure for controllably repositioning the part receptacle so that the entry opening in the part receptacle is consistently oriented relative to the guiding structure in both the loading and unloading positions.

In one form, the structure for controllably repositioning the part receptacle includes a pin on one of the part receptacle and guiding structure and a groove for accepting the pin on the other of the part receptacle and guiding structure.

The structure for controllably repositioning the part receptacle may reposition the part receptacle by rotating the part receptacle about an axis as the part receptacle is moved between its loading and unloading position.

In one form, the structure for controllably repositioning the part receptacle positions the part receptacle in its unloading position so that the part therein passes through the entry opening under the force of gravity.

The structure for controllably repositioning the part receptacle, in one form, rotates the part receptacle about an axis through approximately 180° as the part receptacle is moved between its loading and unloading positions.

The part receptacle may have a body with a discharge opening communicating through the body to the part storage space and a closure element mounted to the body for pivoting movement between open and closed positions. Cooperating structure can be provided on the guiding structure and part receptacle for allowing the closure element to move from one of its open and closed positions to the other of its open and closed positions as an incident of the part receptacle moving between the first and second location.

Structure can be provided for treating a part in the part receptacle with the part receptacle in a treating position between the loading and unloading positions. The structure for controllably repositioning the part receptacle relative to the guiding structure preferably consistently orients the part receptacle relative to the guiding structure with the part receptacle in the treating position.

In one form, the treating structure directs a flowable material, such as air or a liquid, against a part in the part receptacle with the part receptacle in the treating position. There may be additional structure for accumulating a flowable material directed against the part in the part receptacle.

Structure may be provided cooperating between the guiding structure and part receptacle for limiting movement between the part receptacle and the guiding structure in at least one relative position, such as the treating position.

Flowable material can be directed through the entry opening, against a part in the storage space and out a discharge opening, where it may be accumulated.

The invention further contemplates the above structure in combination with a machine for performing an operation on a part and structure for transferring a part worked on by the machine to the part receptacle at the first location.

In another form of the invention, an apparatus is provided for conveying discrete parts in a part receptacle between first and second locations. The conveying apparatus has structure for guiding movement of a part receptacle between the first and second locations and structure for conveying a part receptacle a) from the first location to the second location and b) from the second location to the first location.

DETAILED DESCRIPTION OF THE DRAWINGS

Figure 3:
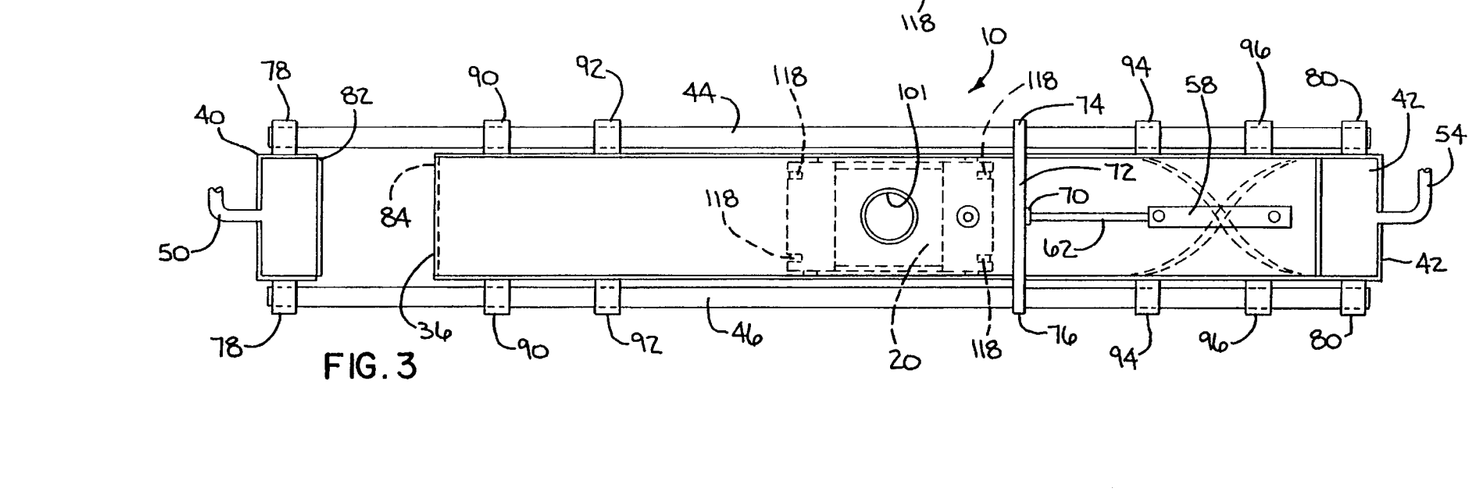
FIG. 3 is a plan view of the inventive apparatus with the part receptacle conveying as in FIG. 2.
Figure 4:
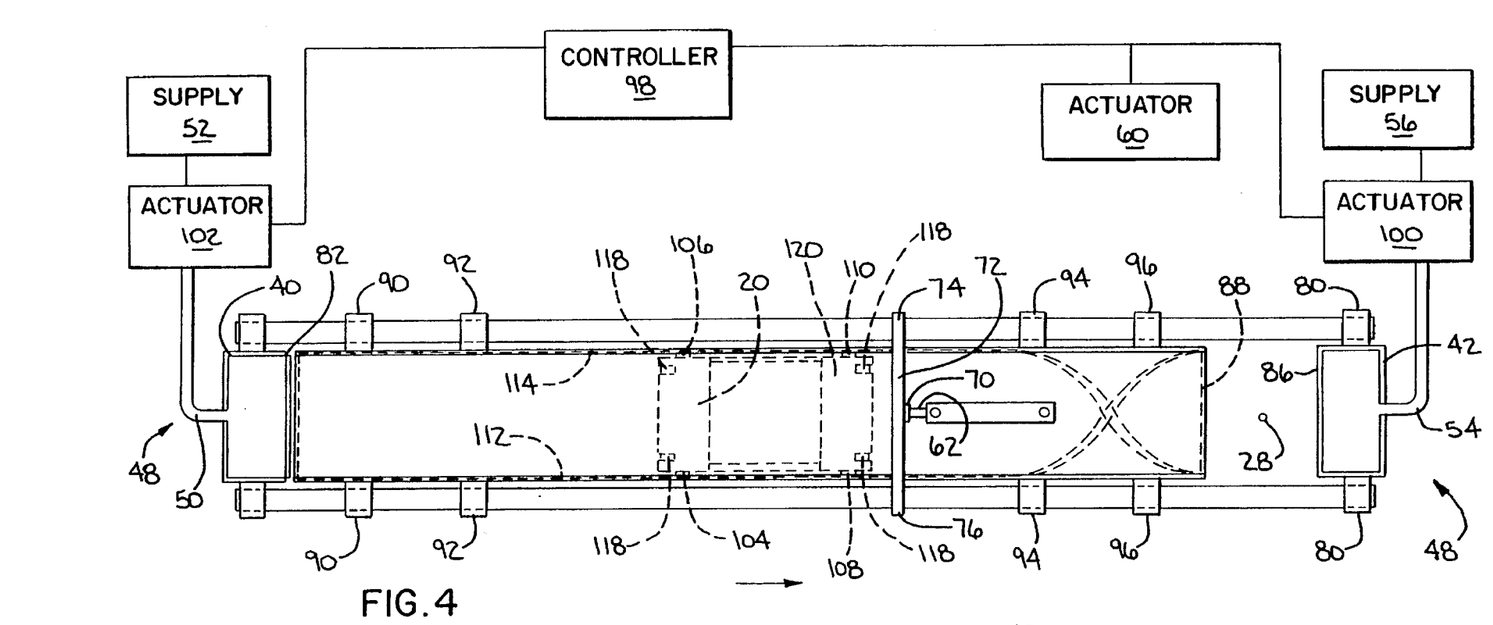
FIG. 4 is a plan view of the inventive apparatus showing the part receptacle conveying from left to right from the loading position toward an unloading position.
Figure 5:
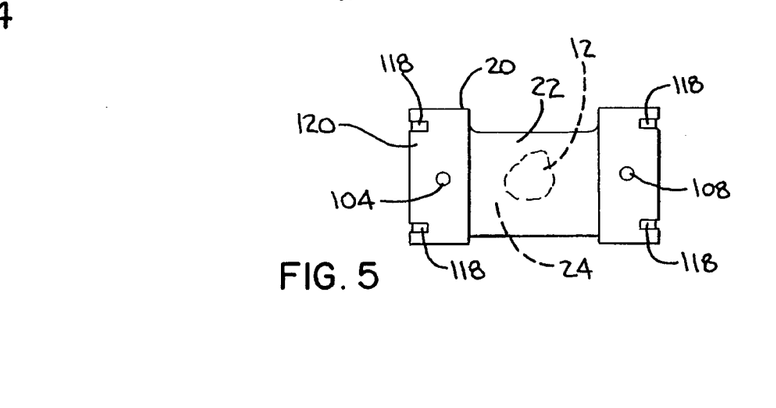
FIG. 5 is a side elevation view of the part receptacle.

In FIGS. 1–5, one form of conveying apparatus, according to the present invention, is shown at 10. The conveying apparatus has a wide range of applications and can be used to convey parts of different size and shape. In FIG. 5, one exemplary part 12 is shown and is intended only to be illustrative of parts that can be conveyed with the apparatus 10.

Figure 1:
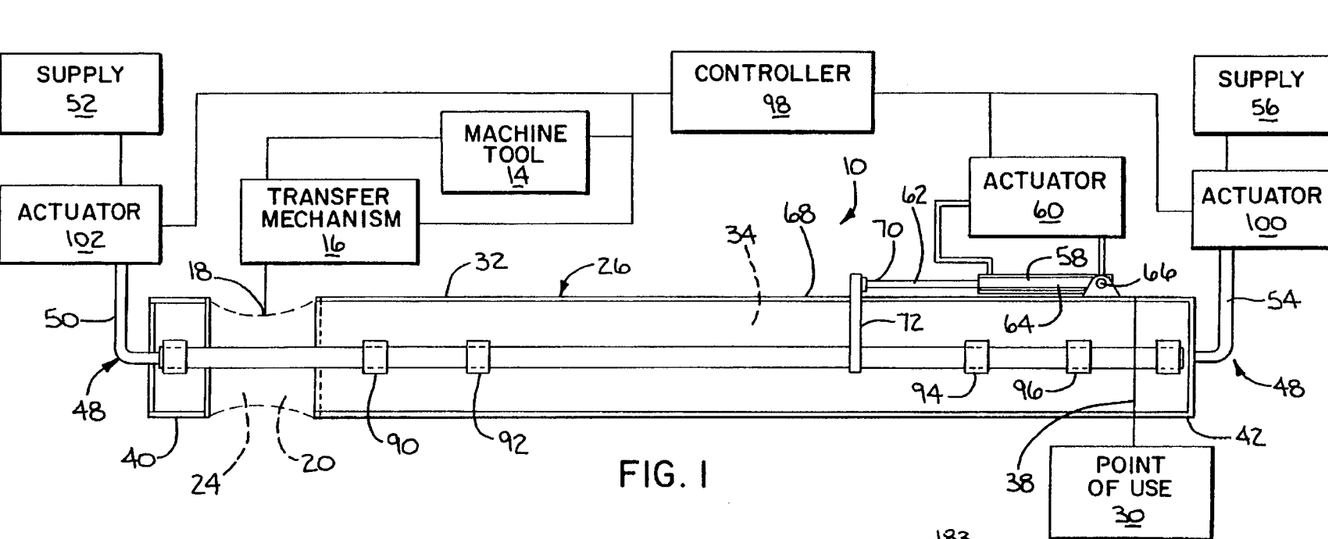
FIG. 1 is a side elevation view of an apparatus for conveying discrete parts in a predetermined path, according to the present invention, and operatively associated with schematically shown parts delivering and receiving mechanisms, with a movable part receptacle on the apparatus shown in a loading position.

One exemplary system into which the parts conveying apparatus 10 can be incorporated is shown schematically in FIG. 1. In FIGS. 1–5, a machine tool 14 is shown and may take any form and may perform one or a number of diverse operations on the part 12. After completion of the machining operation(s), the part 12 is moved by a transfer mechanism 16 from the working area around the machine tool 14 to a first location 18 at which the part 12 is placed in a receptacle 20.

The part receptacle 20 has a body 22 defining a temporary parts storage space 24. A means at 26 guides movement of the part receptacle 20 with the part 12 therein from the first location 18 to a second location 28. The part 12 is then released to a point of use 30, which may be a collection bin or a work station for another machine tool (not shown), which performs another operation on the part 12.

The guiding means 26 includes an elongate conduit 32 defining an internal space 34 within which the part receptacle 20 is guided between the first and second locations. Preferably, the space 34 has a uniform, circular cross section throughout its length. The conduit 32 has first and second open ends 36, 38, with there being means, in the form of end caps 40, 42, for selectively closing the open ends 36, 38 of the conduit 32. Means including diametrically oppositely located guide rails 44, 46 cooperate between the conduit 32 and the first and second caps 40, 42 to guide relative movement between a first position, shown in FIG. 4, wherein the end cap 40 closes the first conduit end 36 and the second conduit end 38 is open, and a second position, shown in FIGS. 1–3, wherein the second end cap 42 closes the second end 38 of the conduit 32 and the first end 36 of the conduit 32 is open.

With the conveying apparatus 10 in the first state, shown in FIG. 4, means 48 can be operated to convey the part receptacle 20 from left to right within the conduit space 34 from the first location, which represents the loading position, to the second location at the opposite end of the conduit 32, which represents the unloading position.

In one form, the means 48 is a pneumatic means including a conduit 50 carried on the end cap 40 which controllably directs air from a pressurized supply 52 from left to right into the conduit space 34 against the receptacle 20 to thereby convey the receptacle 20 from the first location 18 to the second location 28. The means 48 for conveying the part receptacle 20 includes a second conduit 54 associated with the end cap 42 for directing pressurized air from a supply 56 from right to left through the conduit 32 against the receptacle 20 to thereby move the receptacle 20 within the space 34 from the unloading position back to the loading position with the apparatus in the second state, as shown in FIGS. 1–3.

Figure 2:
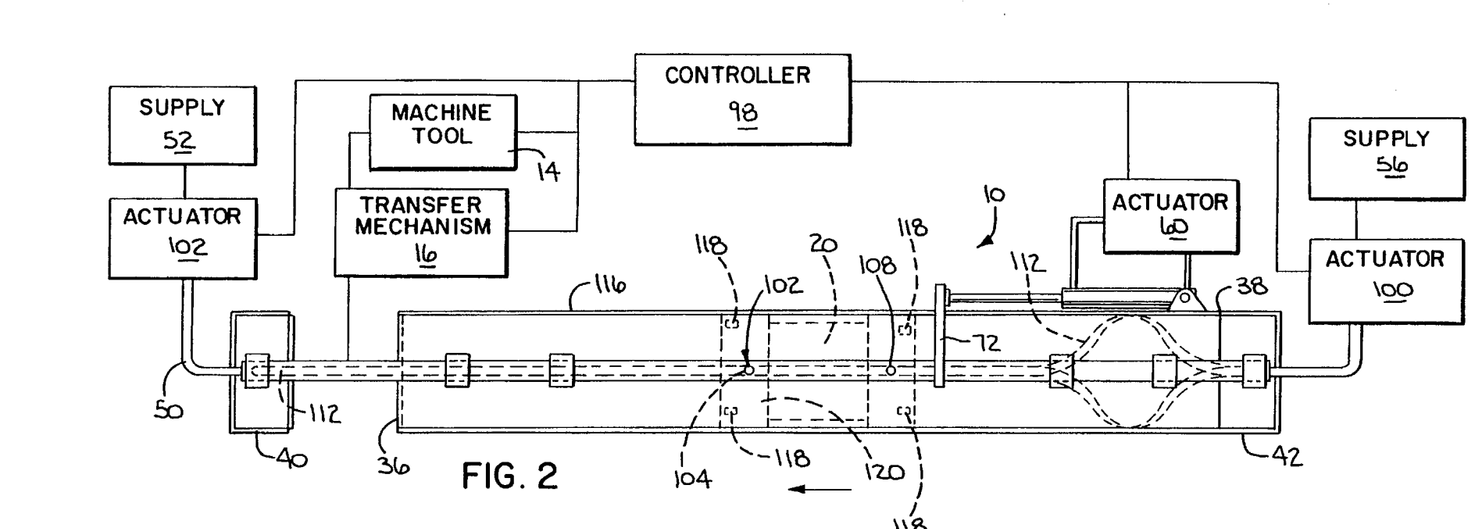
FIG. 2 is a view as in FIG. 1 showing the part receptacle conveying from right to left toward the loading position of FIG. 1.

The apparatus 10 is changed between the state in FIGS. 1–3 and that in FIG. 4 by repositioning the conduit 32 relative to the end caps 40, 42, which is accomplished by a hydraulic or pneumatic cylinder 58. The cylinder 58 is controlled by an actuator 60 which selectively controls extension and retraction of an actuating rod 62.

The cylinder body 64 is connected to mounting ears 66 on the top 68 of the conduit 32. The distal end 70 of the rod 62 is connected to a yoke 72 which extends through approximately 180° around the top of the conduit 32. The free yoke ends 74, 76 are fixedly connected, one each, to the guide rails 44, 46. Extension of the rod 62 causes the conduit 32 to shift from left to right, while retraction of the rod 62 causes the conduit 32 to shift from right to left.

The cap 40 has diametrically oppositely projecting mounting ears 78 which allow it to be fixedly attached to the guide rails 44, 46. The end cap 42 has similar ears 80 which are likewise fixed to the rails 44, 46 so that the spacing between the end caps 40, 42 is fixed. The stroke of the cylinder 58 is set so that with the rod 62 retracted, a chamfered, annular edge 82 on the end cap 40 nests against a mating seat/edge 84 at the conduit end 36. Retraction of the rod 62 seats an annular edge 86 on the cap 42 against a seat/edge 88 at the conduit end 38. The conduit has diametrically opposite ear pairs 90, 92 at one end thereof and diametrically opposite ear pairs 94, 96 at the other end thereof to precisely and smoothly guide movement of the conduit 32 along the rails 44, 46 so that the end caps 40, 42 fully seat to close the conduit ends 36, 38.

A controller 98 is used to coordinate the transfer of the parts 12 from the machine tool 14 and movement of the parts receptacle 20 from the first location 18 to the second location 28. More particularly, the controller 98 causes the actuator 60 to extend the rod 62 until the end cap 42 closes the conduit end 38. The controller 98 operates an actuator 100 for the means 48 to thereby allow delivery of pressurized fluid from the supply 56 into the conduit 54 from right to left in FIG. 1 to act against and convey the part receptacle 20 to the loading position. The transfer mechanism 16 is then operated to deposit a part 12 through the space between the end cap 40 and conduit end 36 into the receptacle space 24 through an entry opening 101 in the part receptacle 20 communicating with the space 24.

The actuator 60 is then operated to retract the rod 62 which moves the conduit 32 from right to left to cause the end cap 40 to seal the conduit end 36, whereupon an actuator 102 for the second means 48 is operated to permit pressurized fluid from the supply 52 to be directed through the conduit 50 and into the conduit space 34 from left to right against the part receptacle 20, which effects conveyance of the part receptacle 20 to its unloading position.

In a preferred form, the means 26 for guiding movement of the part receptacle includes means at 102 for controllably repositioning the part receptacle 20 as it moves between the first and second locations. More particularly, the means 102 includes guide pins 104, 106, 108, 110 which project radially outwardly from the body 22 of the part receptacle 20. The center axes for the pins 104, 106, 108, 110 reside substantially in the same plane, with the pins 104, 106 being diametrically opposite and at one end of the part receptacle and the pins 108, 110 being diametrically opposite at the other end of the part receptacle. The pins 104, 108 move in a guide groove 112 in the conduit 32, while the pins 106, 110 move in a similarly configured guide groove 114. The grooves 112, 114 are defined by undercuts in the wall 116 of the conduit 32. Because the movement of the receptacle 20 is controlled, the receptacle 20 is consistently oriented in both the loading and unloading positions.

In a preferred form, the grooves 112, 114 extend in a straight path from the one conduit end 36 to a point beyond the midportion of the conduit. Adjacent to the other conduit end 38, the grooves 114, 116 move in a helical path as a result of which the part receptacle 20 is caused to rotate, preferably through 180°. With this arrangement, the part receptacle 20 is inverted from its orientation in the loading position so that at the second location 28 the part 12 therein can fall out of the opening 102 into a receptacle or be delivered to another point of use 30.

To guide smooth movement of the part receptacle 20, a plurality of circumferentially spaced guide pads 118 are provided on the peripheral surface 120 of the receptacle 20. These pads 118 maintain concentric relationship between the receptacle 20 and conduit space 34 so that the pins 104, 106, 108, 110 do not bind as they move in the guide grooves 112, 114.

Figure 6:
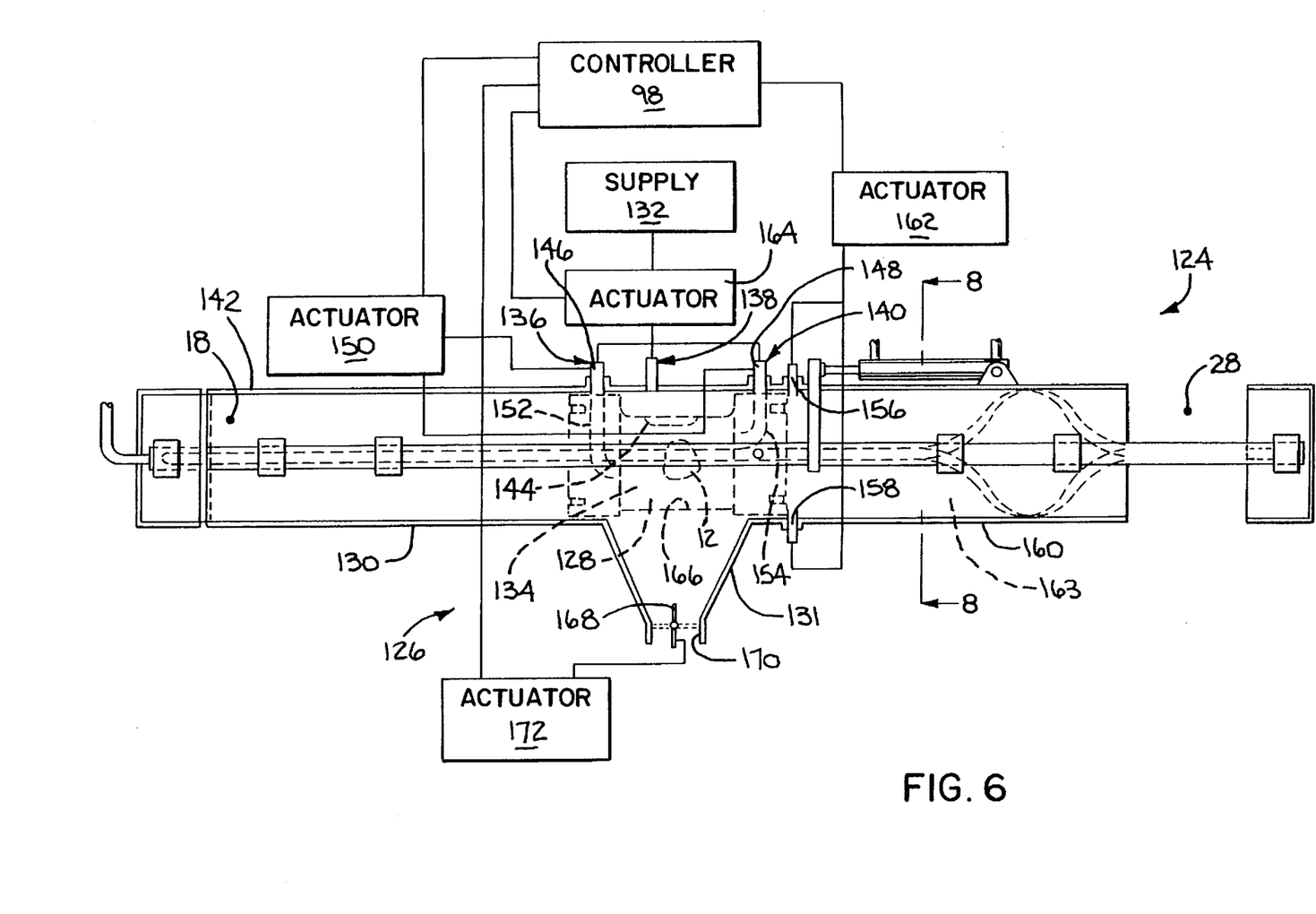
FIG. 6 is a side elevation view of a modified form of the inventive apparatus including a treating system for directing a flowable material against a part in the part receptacle.
Figures 7, 8:
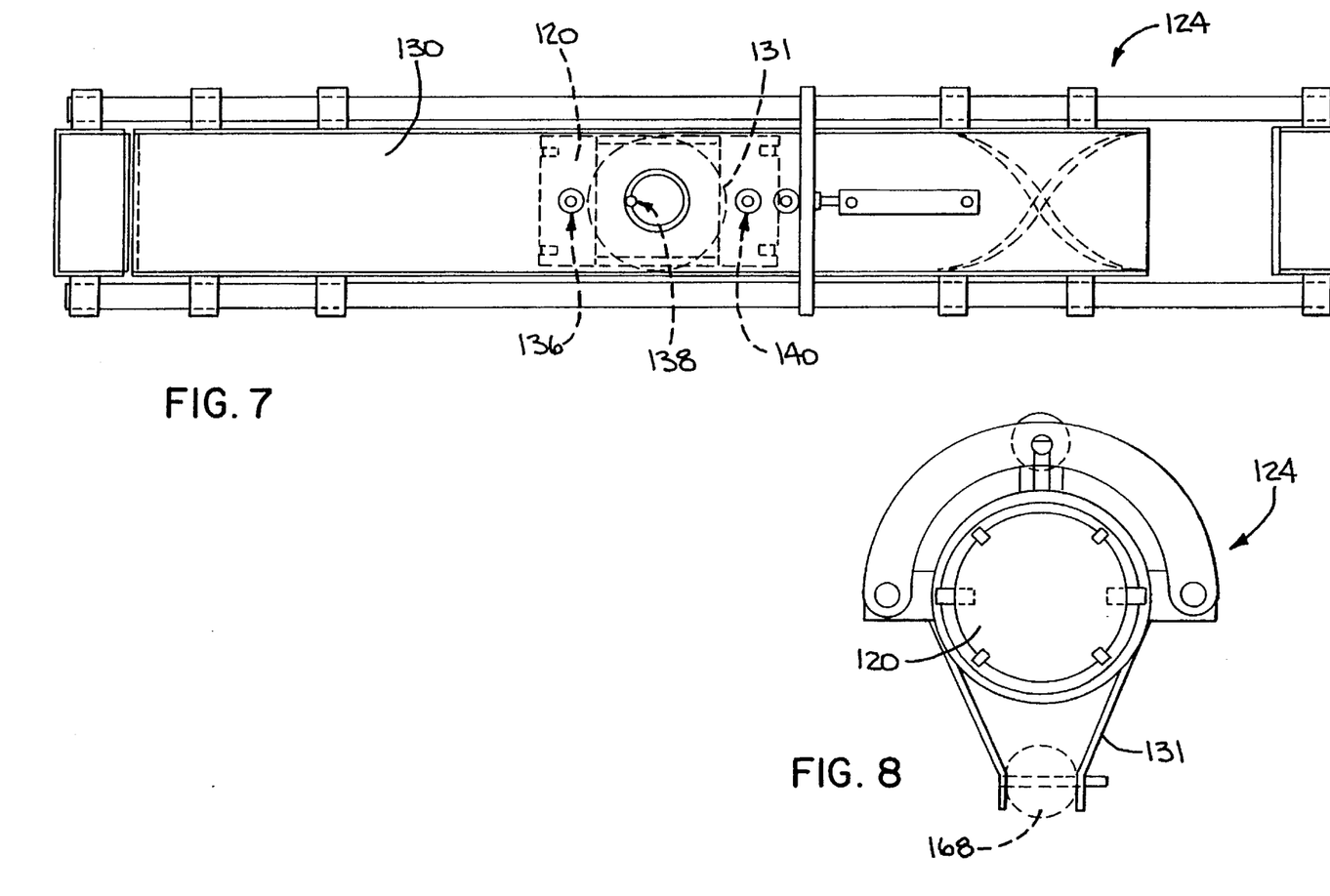
FIG. 7 is a plan view of the inventive apparatus in FIG. 6.
FIG. 8 is an enlarged cross-sectional view of the inventive apparatus taken along line 8—8 of FIG. 6.

In FIGS. 6–8, a modified form of parts conveying apparatus, according to the present invention, is shown at 124. The apparatus 124 is constructed similarly to the apparatus 10, previously described, but is modified by including means at 126 for treating a part. A modified form of part receptacle 128 is also used for conveying a part 12 between the first location 18 and the second location 28. Parts that are the same in the apparatus 10, 124 are numbered the same herein.

The apparatus 124 has a conduit 130 that is similar to the conduit 32, previously described, but which is cut out at its bottom to accommodate a funnel-shaped collector 131. The collector 131 accumulates a flowable material, which is generally a liquid, from a pressurized supply 132 thereof. The flowable material may be a lubricant, a washing fluid, a flowable solid material, a coating, air or the like.

More particularly, the flowable material from the supply 132 is delivered to an internal parts storage space 134 in the receptacle 128 and against the part therein through feeder tubes 136, 138, 140. The feeder tube 138 is fixed to the upper wall 142 of the conduit in alignment with an entry opening 144 in the receptacle 128, with the receptacle 128 in a treating position over the collector 131.

The feeder tubes 136, 140 include nozzles 146, 148, which are radially extendable and retractable through an actuator 150, and feed portions 152, 154 integrally formed with the receptacle 128. The feed portions 152, 154 are shaped to direct pressurized flowable material against a part 12 in the storage space 134 from opposite ends thereof to effect thorough coverage of the part 12.

Receptacle stops 156, 158 project radially through the conduit wall 160 at diametrically opposite locations. Through an actuator 162, the stops 156, 158 are simultaneously selectively extended into the space 163 bounded by the conduit wall 160 and retracted therefrom. With the stops 156, 158 in an extended position, the receptacle 128 abuts thereto in the proper treating position as it moves from the loading position towards the unloading position.

With the receptacle 128 in the treating position, the actuator 150 is operated to extend the nozzles 146, 148 against the feed portions 152, 154 to establish communication between the supply 132 and the part storage space 134.

An actuator 164 is then operated by the controller 98 to release the flowable material from the supply 132 into the feed tubes 136, 138, 140 to thereby shower the part 12 in the receptacle.

The flowable material in the space 134 escapes through a discharge opening 166 at the bottom of the receptacle 128 and is accumulated in the collector 131. At the bottom of the collector, a pivotable valve 168 is provided to selectively close and open a necked-down outlet 170 at the bottom of the collector 131. An actuator 172 selectively moves the valve 168 from the open solid line position in FIG. 6 to the closed phantom line position in response to a signal from the controller 98.

A supply of air can optionally be directed into the space 134 through the feed tubes 136, 138, 140, as a substitute for the liquid and/or solid flowable material or after that flowable material from the supply 132 is introduced, as to effect cleaning and/or drying of the part 12. Once the treating step is concluded, the feed tubes 136, 140 and stops 156, 158 can be retracted to allow continued passage of the receptacle 128 fully through to the unloading position. The receptacle 128 is rotated as it conveys toward the unloading position so that it is inverted and releases the contained pan which falls by gravity through the space between the end cap 42 and conduit end 38.

In FIGS. 9–12, a further modified form of apparatus for conveying parts, according to the invention, is shown at 176. The principal difference between the apparatus 176 and the apparatus 124 is in the construction of the pans receptacle 178, which allows the receptacle 178 to be loaded and unloaded without rotating the receptacle as it approaches the unloading position.

Figure 9:
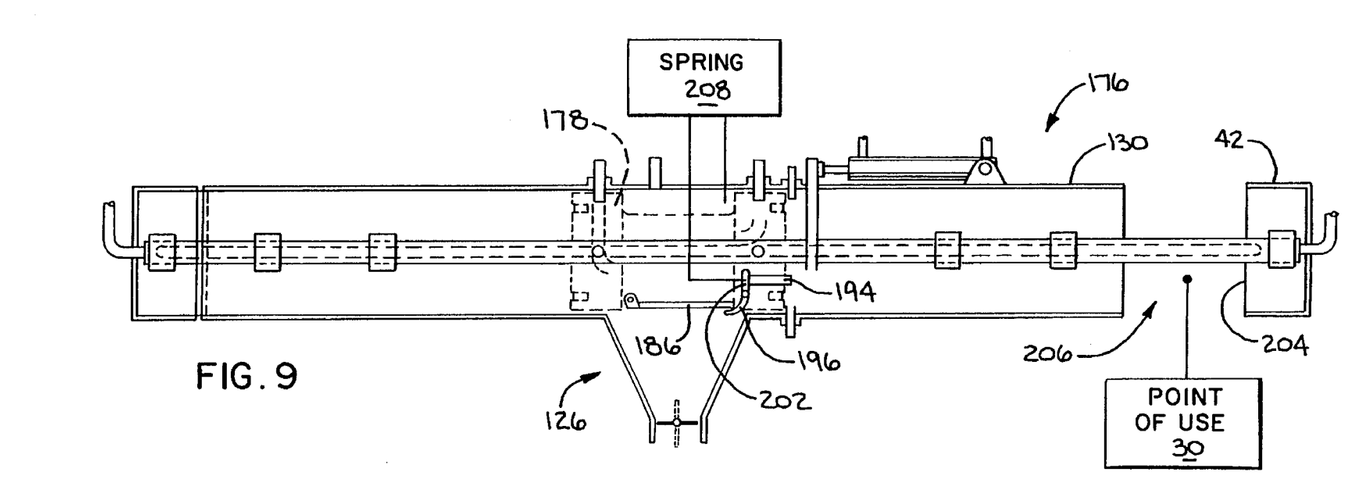
FIG. 9 is a side elevation view of a further modified form of conveying apparatus, according to the present invention, which guides movement of the part receptacle in a path that is different than the path for the part receptacle defined by the apparatus in FIGS. 1–8.

The receptacle 178 has a parts storage space 180 and an entry opening 182 communicating through a wall 183 on the receptacle with the space 180. A parts discharge opening 184 is provided in the bottom of the receptacle wall 183. A closure element 186 is connected to the receptacle wall 183 for pivoting movement relative thereto about a pivot pin 188. A spring 190 normally biases the closure element 186 to a closed position, as shown in FIG. 9. The closure element 186 is movable from the closed position to the open position, shown in FIG. 2, preferably under the weight of the part 12. The spring 190 develops a sufficient force to maintain the closure element 186 closed in the absence of a part 12 resting thereagainst.

With the closure element 186 closed and a part 12 in the storage space 180, the closure element 186 is releasably maintained in its closed state by a means/latch assembly at 192. The latch assembly 192 includes an actuator pin 194 and an L-shaped latch element 196 that is connected to the receptacle wall 182 for pivoting movement relative thereto about a pin 198.

Figure 12:
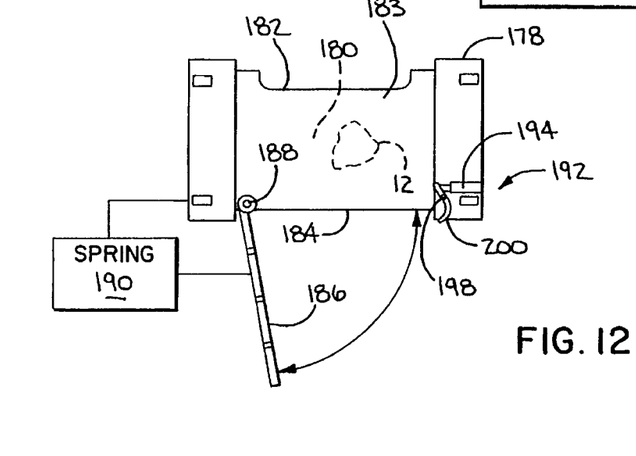
FIG. 12 is an enlarged, side elevation view of the part receptacle in FIG. 11.

With the closure element 186 in the closed position of FIG. 9, the latch element 196 is pivoted in a clockwise direction in FIG. 12 about the pin 198 to situate one leg 200 of the latch element underneath the closure element 186 to thereby prevent the closure element 186 from moving into its open position even with a part in the receptacle. With the latch element 196 in the latched position, the other leg 202 of the latch element 196 drives the actuating pin 194 to the loaded position in FIG. 9.

Figure 10:
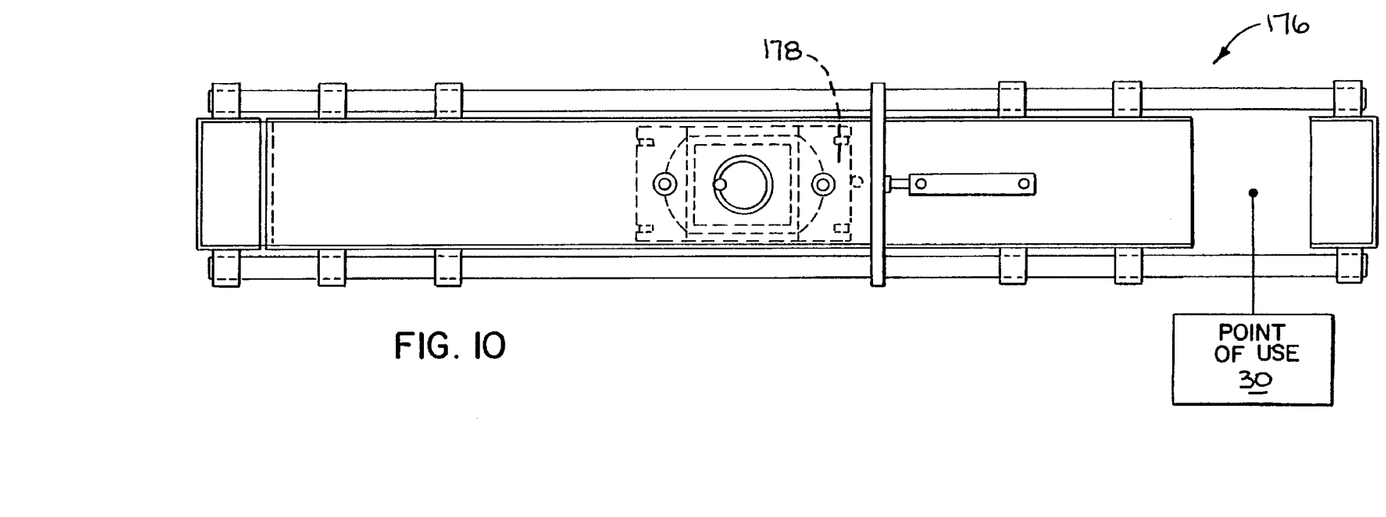
FIG. 10 is a plan view of the conveying apparatus of FIG. 9.
Figure 11:
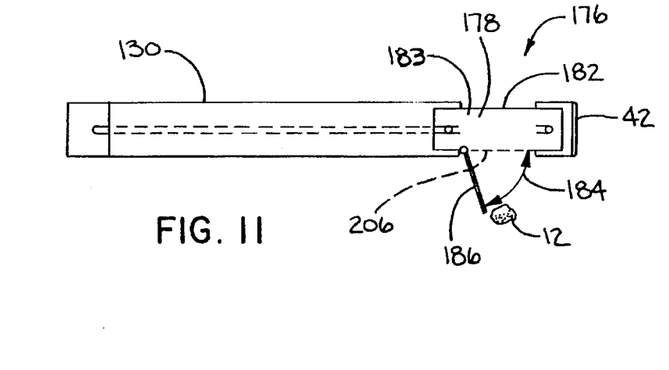
FIG. 11 is a schematic side elevation view of a modified form of part receptacle for use in the apparatus of FIG. 9 and operatively associated with a conduit for guiding movement thereof.

As the pan receptacle 178 is conveyed/propelled from left to right in FIGS. 9 and 10, the facing wall 204 on the end cap 42 depresses the actuating pin 194. The depressed pin acts on the leg 202 to effect a counterclockwise pivoting of the latch element 196 from the FIG. 9 position. As this occurs, the leg 200 clears away from the pivot path for the closure element 186, whereupon the weight of the part 12 in the part receptacle 178 urges the closure element 186 from the closed position of FIG. 9 to the open position of FIG. 12.

As the closure element 186 opens, the part 12 therein drops through the discharge opening 184 and through the space 206 between the conduit 130 and the end cap 42 to be delivered to a point of use 30.

The latch element 196 can be automatically reset under the force of a spring 208, which normally biases the latch element 196 into the latched position shown in FIG. 9. After the part 12 is released from the storage space 180, the spring 190 will urge the closure element 186 back to its closed position. With the conduit 130 repositioned against the end cap 42, the receptacle 178 can be propelled from right to left as previously described. As this occurs, the spring 208 urges the latch element 196 back to its latch position and thereby reloads the actuator pin 194.

While the embodiment in FIGS. 9–12 shows a means for treating parts 126, this means 126 is optional.

The foregoing disclosure of specific embodiments is intended to be illustrative of the broad concepts comprehended by the invention.

I claim:

1. An apparatus for conveying discrete parts between first and second locations, said conveying apparatus comprising:

a receptacle for at least one part;

an elongate conduit defining an internal space within which the part receptacle is guided between the first and second locations, said elongate conduit having first and second ends, there being a first cap for selectively closing the first end of the elongate conduit and a second cap for selectively closing the second end of the elongate conduit, there further being means cooperating between the elongate conduit and the first and second end caps to guide relative movement of the first and second end caps and elongate conduit between a) a first position wherein the first end cap closes the first end of the elongate conduit and the second end of the elongate conduit is open and b) a second position wherein the second end cap closes the second end of the elongate conduit and the first end of the elongate conduit is open; and means for exerting a force on the part receptacle and thereby conveying the part receptacle selectively a) from the first location to the second location and b) from the second location to the first location.

2. The parts conveying apparatus according to claim 1 wherein the means for conveying the part receptacle comprises means for controllably delivering a pressurized fluid against the part receptacle to at least one of a) move the part receptacle from the first location to the second location and b) move the part receptacle from the second location to the first location.

3. An apparatus for conveying discrete parts between first and second locations, said conveying apparatus comprising:

a receptacle for at least one part;

an elongate conduit defining an internal space within which the part receptacle is guided between the first and second locations, said elongate conduit having first and second ends, there being a first cap for selectively closing the first end of the elongate conduit and a second cap for selectively closing the second end of the elongate conduit, said first cap closing the first end of the elongate conduit with the elongate conduit and first and second caps in a first relative position, said second cap closing the second end of the elongate conduit with the elongate conduit and first and second caps in a second relative position, there further being means cooperating between the elongate conduit and the first and second end caps comprising at least one elongate rail and means cooperating between the at least one elongate rail and at least one of the elongate conduit and the first and second end caps for guiding relative movement between the at least one elongate rail and the at least one of the elongate conduit and the first and second end caps as the elongate conduit and first and second end caps are relatively moved between the first and second positions; and means for exerting a force on the part receptacle and thereby conveying the part receptacle selectively a) from the first location to the second location and b) from the second location to the first location.

4. The parts conveying apparatus according to claim 3 wherein the elongate conduit guides movement of the part receptacle between a loading position and an unloading position, said pans conveying apparatus further including means for treating a pan in the pan receptacle with the part receptacle in a treating position between the loading and unloading positions.

5. The parts conveying apparatus according to claim 4 wherein there are means cooperating between the part receptacle and elongate conduit for controllably repositioning the part receptacle relative to the elongate conduit so that the part receptacle is consistently oriented relative to the part receptacle with the part receptacle in the treating position.

6. The parts conveying apparatus according to claim 4 wherein the treating means comprises means for directing a flowable material against a part in the part receptacle with the part receptacle in the treating position.

7. The parts conveying apparatus according to claim 6 including means for accumulating flowable material directed by the means for directing a flowable material against a part in the part receptacle.

8. The parts conveying apparatus according to claim 4 wherein the part receptacle has a body with a parts storage space, a discharge opening communicating through the body to the parts storage space, a closure element, and means for mounting the closure element to the body for movement between open and closed positions, there being means cooperating between the elongate conduit guiding means and part receptacle for allowing the closure element to move from one of its open and closed positions to the other of its open and closed positions as an incident of the part receptacle moving between the first and second locations.

9. The parts conveying apparatus according to claim 8 wherein the means for mounting the closure element to the body of the part receptacle comprises means for mounting the closure element to the body of the part receptacle for pivoting movement between open and closed positions.

10. The parts conveying apparatus according to claim 4 wherein the part receptacle has a body defining a parts storage space and entry and discharge openings communicating through the body to the pans storage space and the treating means comprises means for directing flowable material through the entry opening against a part in the storage space and through the discharge opening with the part receptacle in the treating position.

11. The parts conveying apparatus according to claim 10 including means for accumulating flowable material directed out the discharge opening in the part receptacle.

12. The parts conveying apparatus according to claim 3 including means cooperating between the elongate conduit and part receptacle for limiting movement between the part receptacle and elongate conduit in at least one relative position.

13. The parts conveying apparatus according to claim 3 wherein the part receptacle has a part storage space and an entry opening communicating with the storage space and the elongate conduit guides movement of the part receptacle between a loading position and an unloading position and includes means for controllably repositioning the part receptacle so that a part in the part receptacle passes through the entry opening in the part receptacle under the force of gravity with the part receptacle in the unloading position.

14. The parts conveying apparatus according to claim 13 wherein the means for controllably repositioning the part receptacle comprises means for rotating the part receptacle about an axis through approximately 180° as the part receptacle is moved between its loading and unloading position.

15. The parts conveying apparatus according to claim 3 in combination with a machine for performing an operation on a part and means for transferring a part worked on by the machine to the part receptacle in the first location.

16. The parts conveying apparatus according to claim 15 wherein the part receptacle has a pans storage space and an entry opening communicating with the parts storage space and the means for conveying the part receptacle includes means for repositioning the part receptacle at the second location so that a part in the part storage space discharges through the entry opening.

17. The parts conveying apparatus according to claim 3 wherein the means for conveying the part receptacle comprises means for controllably delivering a pressurized fluid against the part receptacle to at least one of a) move the part receptacle from the first location to the second location and b) move the part receptacle from the second location to the first location.

18. An apparatus for conveying discrete parts in a part receptacle between first and second locations, said conveying apparatus comprising:

an elongate conduit defining an internal space within which a part receptacle is guided between the first and second locations, said elongate conduit having first and second ends, there being a first cap for selectively closing the first end of the elongate conduit and a second cap for selectively closing the second end of the elongate conduit, there further being means cooperating between the elongate conduit and the first and second end caps to guide relative movement of the elongate conduit and first and second end caps between a) a first position wherein the first end cap closes the first end of the elongate conduit and the second end of the elongate conduit is open and b) a second position wherein the second end cap closes the second end of the elongate conduit and the first end of the elongate conduit is open; and means for exerting a force on the part receptacle and thereby conveying a part receptacle selectively a) from the first location to the second location and b) from the second location to the first location.

19. The parts conveying apparatus according to claim 18 further including means for treating a part in a part receptacle in a treating position between the first and second locations.

20. The parts conveying apparatus according to claim 18 wherein the means for conveying the part receptacle comprises means for controllably delivering a pressurized fluid against the part receptacle to at least one of a) move the part receptacle from the first location to the second location and b) move the part receptacle from the second location to the first location.

21. An apparatus for conveying discrete parts in a part receptacle between first and second locations, said conveying apparatus comprising:

an elongate conduit defining an internal space within which a part receptacle is guided between the first and second locations, said elongate conduit having first and second ends, there being a first cap for selectively closing the first end of the elongate conduit and a second cap for selectively closing the second end of the elongate conduit, there further being means cooperating between the elongate conduit and the first and second end caps for guiding movement of the first and second end caps relative to the elongate conduit between a) a first position wherein the first end cap closes the first end of the elongate conduit and b) a second position wherein the second end cap closes the second end of the elongate conduit, said guiding means including at least one elongate rail and means cooperating between the at least one elongate rail and at least one of the elongate conduit and the first and second end caps for guiding relative movement between the at least one elongate rail and the at least one of the elongate conduit and the first and second end caps as the elongate conduit and first and second end caps are relatively moved between the first and second positions; and means for exerting a force on the part receptacle and thereby conveying a part receptacle a) from the first location to the second location and b) from the second location to the first location.

22. The parts conveying apparatus according to claim 21 wherein the means for conveying the part receptacle comprises means for controllably delivering a pressurized fluid against the part receptacle to at least one of a) move the part receptacle from the first location to the second location and b) move the part receptacle from the second location to the first location.

\* \* \* \* \*